US009483822B2

(12) United States Patent
Madabhushi et al.

(10) Patent No.: US 9,483,822 B2
(45) Date of Patent: Nov. 1, 2016

(54) CO-OCCURRENCE OF LOCAL ANISOTROPIC GRADIENT ORIENTATIONS

(71) Applicant: Case Western Reserve University, Cleveland, OH (US)

(72) Inventors: Anant Madabhushi, Beachwood, OH (US); Pallavi Tiwari, Shaker Heights, OH (US); Prateek Prasanna, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 101 days.

(21) Appl. No.: 14/607,145

(22) Filed: Jan. 28, 2015

(65) Prior Publication Data

US 2015/0254840 A1 Sep. 10, 2015

Related U.S. Application Data

(60) Provisional application No. 61/950,391, filed on Mar. 10, 2014.

(51) Int. Cl.

*G06K 9/00* (2006.01)
*G06T 7/00* (2006.01)
*G06T 7/40* (2006.01)
*A61B 5/05* (2006.01)

(52) U.S. Cl.

CPC ............. *G06T 7/0012* (2013.01); *G06T 7/403* (2013.01); *G06T 7/404* (2013.01); *G06T 2207/10088* (2013.01); *G06T 2207/10096* (2013.01); *G06T 2207/20021* (2013.01); *G06T 2207/20081* (2013.01); *G06T 2207/30016* (2013.01); *G06T 2207/30068* (2013.01); *G06T 2207/30096* (2013.01)

(58) Field of Classification Search

CPC ............. G06K 9/00; G06T 7/00; A61K 9/00
USPC ............... 382/128, 129, 130, 131, 132, 133; 600/407, 410, 411, 425, 524
See application file for complete search history.

(56) References Cited

U.S. PATENT DOCUMENTS 6,708,055 B2 * 3/2004 Geiser .................. G06T 7/0012 600/425
7,783,092 B2 * 8/2010 Agam .................. G06T 7/0012 382/128

* cited by examiner

*Primary Examiner* — Abolfazl Tabatabai
(74) *Attorney, Agent, or Firm* — Eschweiler & Associates, LLC

(57) ABSTRACT

Methods, apparatus, and other embodiments associated with distinguishing disease phenotypes using co-occurrence of local anisotropic gradient orientations (CoLIAGe) are described. One example apparatus includes a set of logics that acquires a radiologic image (e.g., MRI image) of a region of tissue demonstrating disease pathology (e.g., cancer), computes a gradient orientation for a pixel in the MRI image, computes a significant orientation for the pixel based on the gradient orientation, constructs a feature vector that captures a discretized entropy distribution for the image based on the significant orientation, and classifies the phenotype of the disease pathology based on the feature vector. Embodiments of example apparatus may generate and display a heatmap of entropy values for the image. Example methods and apparatus may operate substantially in real-time. Example methods and apparatus may operate in two or three dimensions.

30 Claims, 10 Drawing Sheets

Start
110 Access ROI
120 Obtain X-Axis Gradient
124 Obtain Y-Axis Gradient
130 Compute X-Axis Gradient Vector
134 Compute Y-Axis Gradient Vector
138 Construct Localized Gradient Vector Matrix in 2-D neighborhood
140 Compute Dominant Orientation
150 Construct Co-occurrence Matrix of dominant orientations
160 Compute Entropy
170 Obtain Entropy Distribution
180 Construct Feature Vector
190 Classify ROI
End

710

CO-OCCURRENCE OF LOCAL ANISOTROPIC GRADIENT ORIENTATIONS

CROSS REFERENCE TO RELATED APPLICATIONS

This application claims the benefit of U.S. Provisional Application 61/950,391 filed Mar. 10, 2014.

BACKGROUND

Numerous pathologies have different histologic phenotypes but similar radiographic appearances. In particular, cancer subtypes often have different histologic phenotypes but similar radiographic appearances. These similar radiographic appearances may lead to difficulties in differentiating the different subtypes in a clinical environment. For example, fibroadenoma (FA), a benign breast tumor, and triple negative (TN), an aggressive breast cancer, have similar morphological appearances when viewed with magnetic resonance imaging (MRI) but have distinct cellular and architectural arrangements when evaluated on a pathology slide under a microscope. Similarly, radiation necrosis (RN) is difficult to distinguish from recurrent brain tumors (rBT) for primary and metastatic brain tumors when viewed with MRI.

Conventional methods for characterizing and distinguishing subtly different pathologies have employed analysis of texture features. However, conventional methods tend to capture global textural patterns. One conventional method that captures global textural patterns employs grey-level co-occurrence matrices (GLCM) and Gabor steerable features to compute global relationships between pixels by averaging responses to various filter operators within a neighborhood to a single global descriptor.

Another conventional approach to distinguishing subtly different pathologies employs local binary patterns (LBP) to provide a pixel-level response that can be used to generate a pixel-level or patch-based classification. Unlike GLCM, LBP provides a signature for every pixel by capturing localized intensity variations across the pixel. However, LBP is highly dependent on the radius parameter, which is critical when extracting local patterns. Additionally, both global and per-pixel texture representations are based on intensity variations and are domain agnostic. However, the histopathological differences between subtly different classes may be manifested in differently oriented nuclei, lymphocytes, and glands. These differences in histopathological architecture, which are reflected in MRI imaging, are not reliably captured on a local scale by conventional methods.

BRIEF DESCRIPTION OF THE DRAWINGS

The accompanying drawings, which are incorporated in and constitute a part of the specification, illustrate various example apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
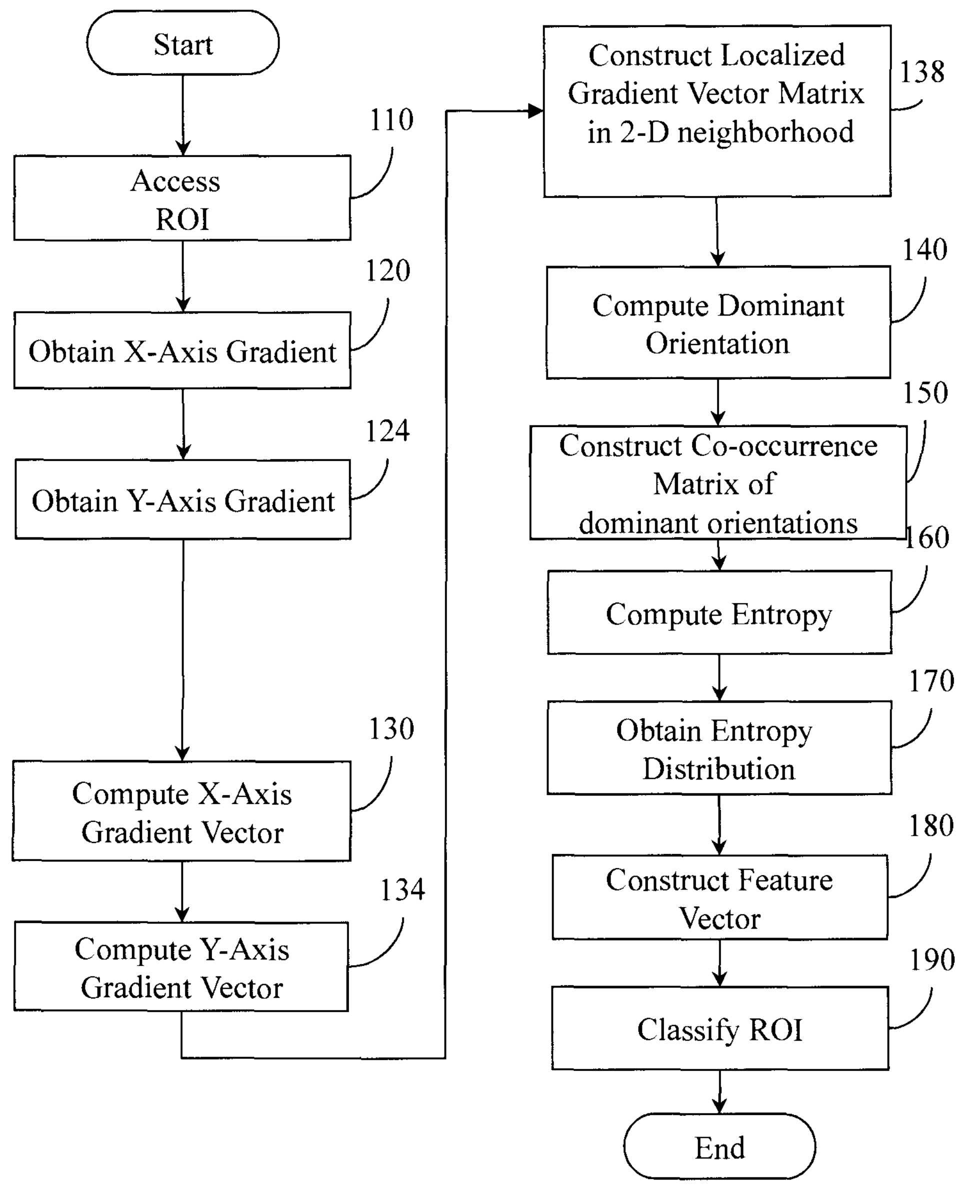
FIG. 1 illustrates an example method of classifying a disease phenotype in a patient.

A number of pathologies have different histologic phenotypes but similar radiographic appearances. In particular, several sub-types of cancer have different histologic phenotypes but similar radiographic appearances. For example, the benign breast tumor fibroadenoma (FA) has a similar morphologic appearance to triple negative (TN) breast cancer when viewed in MRI. However, FA and TN have distinct cellular and architectural arrangements when viewed on a pathology slide under a microscope. Similarly, when viewed in MRI, RN is difficult to distinguish from rBT in primary as well as metastatic brain tumors. While conventional systems and methods for classifying cancer phenotypes have employed texture features to distinguish subtly different pathologies, conventional systems capture differences in global intensity patterns. While examples are presented in the context of brain and breast cancer, example apparatus and methods may be applied to other similar appearing pathologies for other diseases. Additionally, while examples are presented in the context of MRI, example methods and apparatus may be applied to other types of radiologic imaging.

One conventional approach to distinguishing subtly different pathologies employs grey-level co-occurrence matrices (GLCM) and Gabor steerable filters that compute global relationships between pixels by averaging responses to various filter operators within a neighborhood to a single global descriptor. While a popular technique for characterizing and distinguishing subtly different pathologies, the GLCM-Gabor filters methods tend to capture global texture patterns while missing local, pixel-scale image patterns.

Some conventional methods employ texture features that can provide pixel-level responses. For example, methods that employ local binary patterns (LBP), unlike GLCM, provide a signature for every pixel by capturing localized intensity variations across a pixel. However, LBP is highly dependent on the radius parameter, which is critical in extracting local patterns. Furthermore, conventional methods that employ global and per-pixel texture representations are based on intensity variations and are domain agnostic. Conventional methods may thus fail to capture differences between subtly different classes that are manifested in differently oriented nuclei, lymphocytes, and glands, and that are reflected in the imaging.

One conventional method that captures orientation variations is histogram of gradient orientations (HoG). HoG computes a global patch-based signature by computing a histogram distribution of orientations computed on a per-pixel basis. However, HoG, like other conventional texture descriptors, is domain agnostic and is not designed to capture localized per-voxel texture characteristics that appear in MRI imaging.

A conventional variation of HoG includes co-occurrence of histogram of gradient orientations (Co-HoG). Co-HoG computes a high-dimensional feature vector by accumulating values from a co-occurrence matrix computed on gradient orientations. In implemented examples, Co-HoG has been limited to detecting human pedestrians with video management systems. However, Co-HoG does not capture localized per-voxel variations across orientations. Co-HoG is also susceptible to high computational costs due to the high dimensional feature space. Additionally, both Co-HoG and HoG are not biologically intuitive, and are thus sub-optimal solutions to distinguishing subtly different pathologies in a clinical environment.

Some conventional approaches to distinguishing subtly different pathologies employ deep learning (DL) approaches. DL approaches train multiple convolution layers on a large annotated dataset to learn abstract but useful patterns between classes. Although DL approaches may identify complex differentiating patterns across diseases, the features identified by DL approaches are also not biologically intuitive, and cannot be used to understand underlying disease characteristics. Furthermore, DL approaches require an available large training dataset to obtain meaningful results. Thus, DL approaches are also not an optimal solution to distinguishing subtly different pathologies.

Example methods and apparatus distinguish subtly different pathologies of cancer by employing co-occurrence of local anisotropic gradient orientations (CoLIAGe) to capture higher order occurrence patterns of local gradient tensors at a pixel level. Example methods and apparatus capture neighborhood orientation variation with a localized gradient tensor field. The localized gradient tensor field reflects the underlying cellular arrangement of a phenotype being imaged. Example methods and apparatus compute a co-occurrence matrix on the localized gradient tensors. The co-occurrence matrix captures co-occurring patterns of orientation disorder locally.

Example methods and apparatus associate computer-extracted imaging features with disease specific genomic information, including mutational status. Example methods and apparatus employ kinetic analysis of textural changes within breast cancer lesions on DCE-MRI images to more accurately distinguish between different molecular subtypes of breast cancers, and between ER+ lesions with high and low Oncotype DX (ODX) scores than conventional methods. Example methods and apparatus quantitatively measure the degree of order and disorder (e.g. entropy) of localized image gradient orientations. Example methods and apparatus capture the entropy features derived from the co-occurrence of pixel level gradient orientations in MRI images. Example methods and apparatus are independent of the absolute signal intensities found in MRI images and are therefore more robust to MRI drift across scanners than conventional methods. Example methods and apparatus enable quantification of subtle micro-textural changes that may not be captured by conventional methods, including Response Evaluation Criteria in Solid Tumors (RECIST), MRI signal intensity, or pharmacokinetic (PK) parameters. Embodiments of example methods and apparatus capture MRI images using 1.5T or 3.0T magnets, STIR axial and T1 weighted fat saturation axial images, and 8 or 16 channel dedicated breast coils. Other embodiments may employ different magnets, image types, or coils.

Figure 9:
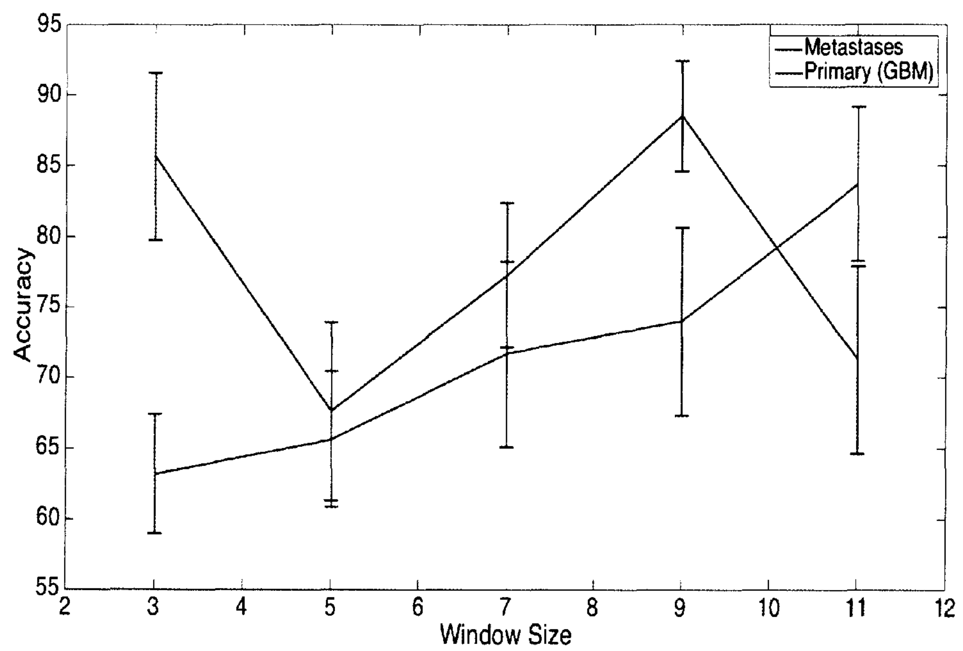
FIG. 9 illustrates a graph comparing window size to accuracy.

Example methods and apparatus thus improve on conventional methods by capturing an orientation variation across neighboring pixels characteristic to a particular pathology through the aggregation of cellular activity in a localized region. Example methods and apparatus distinguish RN from rBT with at least 83.73% accuracy compared to Haralick which achieves only 63.83%, LBP which achieves only 65.75%, and HoG features, which achieves only 72.99%. FIG. 9 illustrates a graph that plots accuracy versus window size. For glioblastomas, accuracy increased with window size. By increasing the accuracy with which subtly different pathologies of cancer are distinguished, example methods and apparatus produce the concrete, real-world technical effect of increasing the probability that at-risk patients receive timely treatment tailored to the particular pathology they exhibit. The additional technical effect of reducing the expenditure of resources and time on patients who have a less aggressive pathology is also achieved. Example methods and apparatus thus improve on conventional methods in a measurable, clinically significant way.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a computerized method 100 for distinguishing disease phenotypes using CoLIAGe. Method 100 includes, at 110, accessing a region of interest (ROI) in a volume illustrated in a magnetic resonance image (MRI). The ROI may be a two dimensional ROI. As described below, the ROI may be a three dimensional ROI. The ROI has a set of pixels. A pixel in the set of pixels has an intensity. In one embodiment, the ROI is defined as $\mathcal{C}=(C,f)$. f(c) is an associated intensity at a first pixel c on a three dimensional (3D) grid C. In one embodiment, the MRI is of a section of tumor tissue. Accessing an ROI includes acquiring electronic data, reading from a computer file, receiving a computer file, reading from a computer memory, or other computerized activity. In one embodiment, the volume illustrated in the ROI is associated with a Gadolinium-contrast (Gd-C) T1-weighted MRI image of a patient demonstrating pathology associated with brain cancer. In another embodiment, the volume illustrated in the ROI is associated with a dynamic contrast enhanced (DCE)-MRI image of a patient demonstrating pathology associated with breast cancer. In other embodiments, different types of cancerous tissue may be imaged using different imaging techniques.

Method 100 also includes, at 120, obtaining an x-axis gradient for a first pixel in the set of pixels. The x-axis gradient is based, at least in part, on the intensity of the pixel. Method 100 also includes, at 124, obtaining a y-axis gradient for the first pixel. The y-axis gradient is based, at least in part, on the intensity of the pixel. In one embodiment, obtaining the x-axis gradient for the first pixel and obtaining the y-axis gradient for the first pixel includes computing $$\nabla f(c) = \frac{\partial f(c)}{\partial X}\hat{i} + \frac{\partial f(c)}{\partial Y}\hat{j}.$$

In this embodiment, $$\frac{\partial f(c)}{\partial X}$$

represents the gradient magnitude along the x-axis, and $$\frac{\partial f(c)}{\partial Y}$$

represents the gradient magnitude along the y-axis.

Method 100 also includes, at 130, computing an x-axis gradient vector for a second pixel. The second pixel is in an N pixel by N pixel neighborhood centered around the first pixel. N is a number. N may be adjustable by a user. Method 100 also includes, at 134, computing a y-axis gradient vector for the second pixel in the N pixel by N pixel neighborhood. In one embodiment, computing the x-axis gradient vector for the second pixel in the N pixel by N pixel neighborhood centered around the first pixel includes computing as $\overrightarrow{\partial f_X}(c_k)$, where $k \in \{1, 2, \ldots, N^2\}$. Computing the y-axis gradient vector for the second pixel includes computing $\overrightarrow{\partial f_Y}(c_k)$, where $k \in \{1, 2, \ldots, N^2\}$.

Method 100 also includes, at 138, constructing a localized gradient vector matrix. The localized gradient vector matrix is based, at least in part, on the x-axis gradient vector for the second pixel, and the y-axis gradient vector for the second pixel. In one embodiment, the localized gradient vector matrix is defined as $\vec{F}=[\overrightarrow{\partial f_X}(c_k)\ \overrightarrow{\partial f_Y}(c_k)]$. In one embodiment, the gradient vector matrix may be constructed for a two dimensional neighborhood having dimensions $N^2 \times 2$.

Method 100 also includes, at 140, computing a dominant orientation for the first pixel. The dominant orientation is based, at least in part, on the localized gradient vector matrix. In one embodiment, computing the dominant orientation for the first pixel includes calculating $$\phi(c) = \tan^{-1}\frac{r_Y^k}{r_X^k},$$

where $r_X^k$ represents the dominant principal component in X, and where $r_Y^k$ represents the dominant principal component in Y. In this embodiment, $k \in \{1, 2, \ldots, N^2\}$. $r_X^k$ and $r_Y^k$ are obtained using principal component analysis (PCA). In one embodiment, the dominant orientation may be computed using principal component analysis (PCA).

Method 100 also includes, at 150, constructing a co-occurrence matrix of dominant orientations from the dominant orientation. In one embodiment, the co-occurrence matrix is an N×N matrix $\mathcal{M}$. The co-occurrence matrix $\mathcal{M}$ captures orientation pairs between pixels that co-occur in a neighborhood $\mathcal{W}_1$. In this embodiment, $$\mathcal{M}_{W_i}(p, q) = \sum_{c_j, c_k}^{W_i} \sum_{p,q=1}^{N} \begin{cases} 1, & \text{if } \phi(c_j) = p \text{ and } \phi(c_k) = q. \\ 0, & \text{otherwise} \end{cases}$$

A discretized dominant orientation for a pixel $c_k$ is represented by $\phi(c_k)$.

$$\bar{\phi}(c_k) = \omega \times \text{ceil}\left(\frac{\phi(c_k)}{\omega}\right),$$

where ω is a discretizing factor.

$$N = \frac{180}{\omega}$$

represents a number of discrete angular bins. ω may be adjusted to alter the number of discrete angular bins. In another embodiment, the floor function may be used instead of the ceiling function.

Method 100 also includes, at 160 computing an entropy for the first pixel. The entropy is based, at least in part, on the co-occurrence matrix. In one embodiment, computing the entropy $\epsilon$ for the first pixel includes computing $\epsilon(c)=\Sigma_{p,q} -\mathcal{M}(p,q)\log(\mathcal{M}(p,q))$.

Method 100 also includes, at 170, obtaining a distribution of the entropy. In one embodiment, obtaining the distribution for the entropy includes computing a histogram of $\epsilon$. The histogram of $\epsilon$ is computed by aggregating $\epsilon(c_k)$, $k \in \{1, \ldots |C|\}$, where |C| is the cardinality of C. The histogram is divided into a plurality of bins. A bin has a size v.

Method 100 also includes, at 180, constructing a feature vector. The feature vector is based, at least in part, on the distribution of the entropy. In one embodiment, the feature vector is a v×1 vector $\mathcal{F}$. Values of $\mathcal{F}$ are obtained from the histogram. The values for the bin size v and neighborhood dimension N may be obtained by employing a support vector machine classifier using a 3-fold cross-validation strategy to obtain optimum values for v and N. In one embodiment, v=30 and N=7. In another embodiment, other values for v and N may be employed.

Method 100 also includes, at 190, controlling a phenotype classifier to classify the ROI based, at least in part, on the feature vector. In one embodiment, controlling the phenotype classifier to classify the ROI comprises distinguishing radiation necrosis (RN) from recurrent brain tumors (rBT) in the ROI. In another embodiment, controlling the phenotype classifier to classify the ROI includes identifying phenotypic imaging signatures of a plurality of molecular sub-types of breast cancer. The plurality of sub-types includes triple negative (TN), estrogen receptor-positive (ER+), human epidermal growth factor receptor positive (HER2+), and benign fibroadenoma (FA). In one embodiment, a computer aided diagnostic system (CADx) is controlled by method 100 to distinguish the disease phenotype found in the ROI. The CADx calculated distinction may then be employed to complement a human pathologist's determination that the ROI represents a first disease phenotype or a second, different phenotype. In another embodiment, the phenotype classifier may distinguish phenotypes of other types of cancer, including prostate cancer.

Improved distinction of disease phenotypes using CoLIAGe may produce the technical effect of improving treatment efficacy and improving doctor efficiency by increasing the accuracy of and decreasing the time required to differentiate disease phenotypes in a patient. Treatments and resources may be more accurately tailored to patients with a first type of cancer so that more appropriate protocols may be employed. For example, method 100 may be employed to identify image-based correlates of TP53 mutation status in BCa. TP53 mutation is associated with poor patient response to therapy. Thus, better identification of TP53 status achieved by method 100 may improve patient outcomes by more effectively modulating BCa treatments.

Using a more appropriately modulated treatment may lead to less therapeutics being required for a patient or may lead to avoiding or delaying a biopsy, a resection, or other invasive procedure. When disease phenotypes are more quickly and more accurately distinguished, patients most at risk may receive a higher proportion of scarce resources (e.g., therapeutics, physician time and attention, hospital beds) while those less at risk may be spared unnecessary treatment, which in turn spares unnecessary expenditures and resource consumption. Example methods and apparatus may thus have the effect of improving patient outcomes.

While FIG. 1 illustrates various actions occurring in serial, it is to be appreciated that various actions illustrated in FIG. 1 could occur substantially in parallel. By way of illustration, a first process could obtain x-axis and y-axis gradients in an ROI, a second process could construct a localized gradient vector matrix, and a third process could obtain the entropy distribution for the ROI. While three processes are described, it is to be appreciated that a greater or lesser number of processes could be employed and that lightweight processes, regular processes, threads, and other approaches could be employed.

While FIG. 1 illustrates processing x-axis gradients and y-axis gradients for a two dimensional ROI, example methods are not so limited. For example, a method may also process z-axis gradients and operate on a three dimensional ROI. When operating on x, y, and z-axis gradients for a three dimensional ROI, methods may include obtaining a z-axis gradient, defining a neighborhood voxel size (e.g., N×N×N) and constructing the localized gradient vector matrix with a dimension of $N^3$×3.

Figure 2:
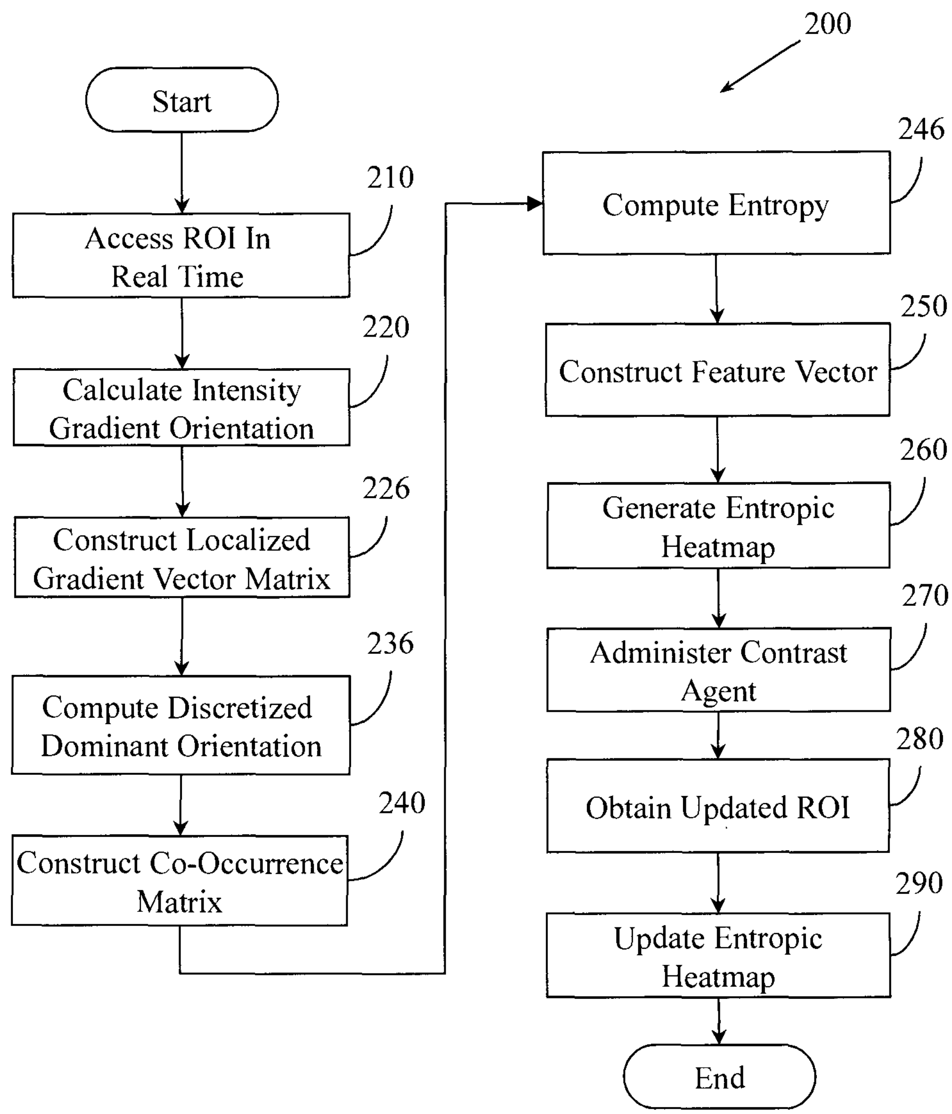
FIG. 2 illustrates an iteration of a method associated with classifying a disease phenotype in a patient.

FIG. 2 illustrates an iteration of a method 200 associated with dynamically distinguishing disease phenotypes. Method 200 is similar to method 100, but the embodiment illustrated in FIG. 2 distinguishes disease phenotypes displayed in an ROI of an MRI volume dynamically substantially in real-time. Method 200 includes, at 210, accessing, substantially in real-time, an ROI of an MRI volume of a region of cancerous tissue. The ROI includes a set of pixels, and a pixel in the set of pixels has an intensity. The ROI may be a two dimensional ROI or a three dimensional ROI.

Method 200 also includes, at 220, calculating an intensity gradient orientation for a first pixel in the set of pixels. In one embodiment, the intensity gradient orientation is based on gradients obtained along an x axis and a y axis. In another embodiment, the intensity gradient orientation may be based on gradients obtained on additional axes (e.g., z axis).

Method 200 also includes, at 226, constructing a localized gradient vector matrix. An element of the localized gradient vector matrix includes an intensity gradient vector for a second pixel located within a local neighborhood of the first pixel. The dimensions of the local neighborhood are defined by a threshold distance. The local neighborhood may be centered on the first pixel. The threshold distance may be adjustable by a user to optimally tailor the neighborhood dimensions to different pathologies or different imaging systems.

Method 200 also includes, at 236, computing a discretized dominant orientation for the first pixel. The discretized dominant orientation is based, at least in part, on the localized gradient vector matrix.

Method 200 also includes, at 240, constructing a co-occurrence matrix. The elements of the co-occurrence matrix include co-occurring dominant orientations for a subset of the set of pixels.

Method 200 also includes, at 246, computing an entropy for the pixel. The entropy is based, at least in part, on the co-occurrence matrix. Computing the entropy for the pixel also includes obtaining a distribution of the entropy. The distribution of the entropy may be obtained from a histogram of the entropy. The histogram of the entropy may be obtained by aggregating the entropy values for the set of pixels. The histogram is divided into discrete bins. Bin size may be optimized based on a training set associated with the disease phenotypes being distinguished.

Method 200 also includes, at 250, constructing a feature vector. The feature vector is based, at least in part, on the distribution of the entropy. Values in the feature vector include values obtained from the discrete histogram bins.

Method 200 also includes, at 260 generating an entropic heatmap. The entropic heatmap is based, at least in part, on the feature vector. The heatmap represents entropy values obtained from the localized orientations on a per-pixel basis. In one embodiment, higher entropy values are displayed in shades of red and lower entropy values are displayed in shades of blue. For example, when distinguishing RN from rBT, entropy values for rBT will be substantially higher than entropy values for RN. Thus, an entropic heatmap of an ROI demonstrating rBT will display relatively more red areas than an entropic heatmap of an ROI demonstrating RN, which will display relatively more blue areas. Method 200 thus improves on conventional methods for distinguishing disease phenotypes by providing clinicians with an intuitive method for identifying an ROI as demonstrating RN or rBT that is faster and more accurate than conventional methods.

Method 200 also includes, at 270, administering a contrast agent to the ROI. The contrast agent may be tailored to target particular areas within the ROI. For example, the contrast agent may be tailored to highlight rBT areas. In one embodiment, the contrast agent may be an organ specific agent, an active targeting agent, a cell labelling agent, or a bio-activated agent. In one embodiment, the contrast agent is a gadolinium contrast agent. In another embodiment, other contrast agents may be administered.

Method 200 also includes, at 280, obtaining an updated ROI, substantially in real time. For example, a first ROI may be obtained before administering the contrast agent. After administration of a contrast agent, a second, updated ROI may be obtained. A series of updated ROIs may be obtained over a clinically relevant time frame. For example, a series of updated ROIs may be obtained over a period of five minutes after administration of the contrast agent. The rate of acquisition of the series of updated ROIs may be adjusted for different clinical needs.

Method 200 also includes, at 290, updating, substantially in real-time, the entropic heatmap. Method 200 updates the entropic heatmap, based, at least in part, on the updated MRI image. For example, after administering the contrast agent, method 200 may update the entropic heatmap, substantially in real-time, based on a series of updated ROIs obtained from the MRI image.

In one embodiment, method 200 also dynamically controls, substantially in real-time, a surgical intervention into the ROI. The surgical intervention is controlled based, at least in part, on the updated entropic heatmap. For example, the ROI may be represented in an MRI image of a region of brain tissue demonstrating brain cancer pathology. The surgical intervention may be gamma knife brain surgery, where method 200 controls the gamma knife to focus on a region of high entropy indicated by the entropic heatmap. Administration of the contrast agent and acquisition of updated ROIs in response to the contrast agent may facilitate faster and more accurate guidance of the surgical intervention than conventional methods. In another embodiment, method 200 identifies changes in pre-treatment and post exposure therapy in an ROI demonstrating breast cancer pathology based on the updated entropic heatmap.

Figure 3:
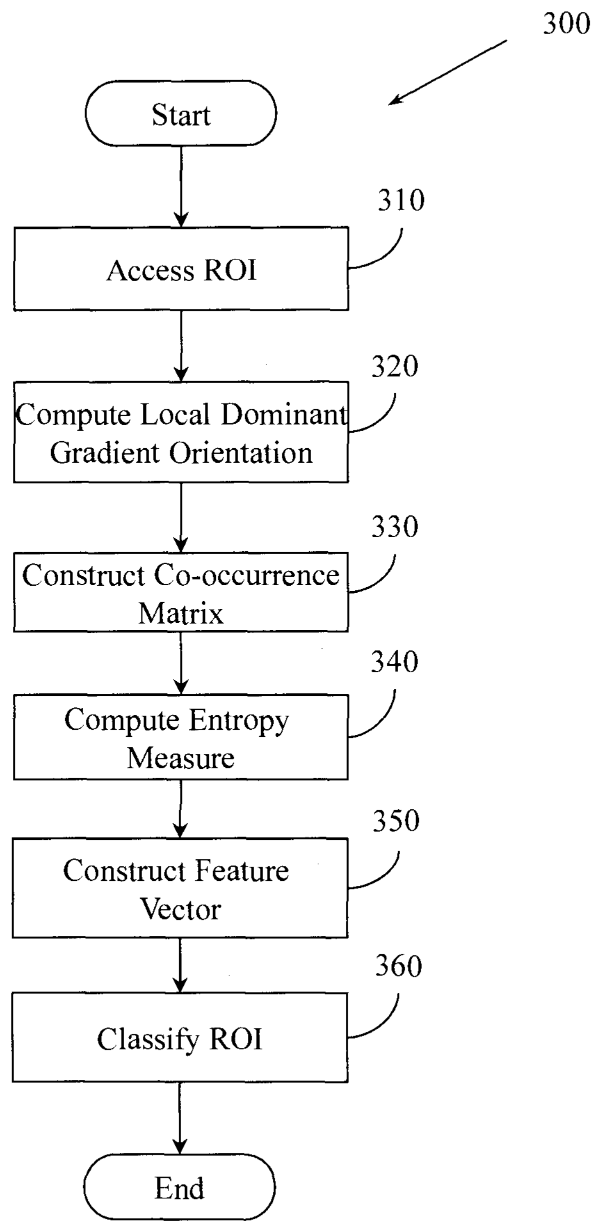
FIG. 3 illustrates an example method of classifying a disease phenotype in a patient.

FIG. 3 illustrates an example method 300 for distinguishing disease phenotypes. Method 300 includes, at 310, accessing an ROI in a volume illustrated in an MRI image. The ROI includes a set of pixels. A pixel in the set of pixels has an intensity.

Method 300 also includes, at 320, computing a local dominant gradient orientation for a first pixel in the set of pixels. In one embodiment, computing the local dominant gradient orientation for the first pixel includes obtaining a set of gradients for the first pixel along a plurality of axes. Computing the local dominant gradient orientation for the first pixel also includes computing a gradient orientation for the pixel based, at least in part, on the set of gradients. Computing the local dominant gradient orientation also includes computing a set of gradient vectors for a plurality of pixels in a local neighborhood. In one embodiment, the local neighborhood is centered on the first pixel, and the neighborhood dimensions are user-definable. Computing the local dominant gradient orientation also includes constructing a localized gradient vector matrix from the set of gradient vectors. Computing the local dominant gradient orientation also includes computing the local dominant gradient orientation for the first pixel using PCA. The PCA is based on the localized gradient vector matrix.

Method 300 also includes, at 330, constructing a co-occurrence matrix for the set of pixels, based, at least in part, on the local dominant orientation. In one embodiment, constructing the co-occurrence matrix includes discretizing the local dominant gradient orientation for the first pixel. Constructing the co-occurrence matrix also includes populating the co-occurrence matrix with local dominant gradient orientation pairs that co-exist between pixels in the neighborhood.

Method 300 also includes, at 340, computing an entropy measure for the set of pixels based, at least in part, on the co-occurrence matrix. In one embodiment, computing the entropy measure includes aggregating the entropy measures for elements of a subset of the set of pixels. The entropy measure is based, at least in part, on the co-occurrence matrix. Computing the entropy measure also includes constructing a histogram of the entropy measure for the set of pixels. The histogram is divided into bins. The bins are discrete bins. A bin may have a threshold size. The threshold size may be adjustable by a user to accommodate different disease phenotypes. For example, a first disease phenotype may be distinguished from a second disease phenotype using a first bin size, while a third disease phenotype may be distinguished from the first disease phenotype more accurately using a second, different bin size.

Method 300 also includes, at 350, constructing a feature vector based on a distribution of the entropy measure. Constructing the feature vector includes extracting entropy measure values from a distribution of the histogram.

Method 300 also includes, at 360, controlling a disease phenotype classification system to classify the ROI based, at least in part, on the feature vector. In one embodiment, controlling the disease phenotype classification system includes constructing a heatmap based on the feature vector. In this example, hot areas of the heatmap represent high entropy values and cool areas of the heatmap represent low entropy values. Classifying the ROI using the heatmap based on the feature vector provides improved accuracy compared to conventional methods of distinguishing disease phenotypes that employ GLCM, HoG, Haralick, or LBP. In another embodiment, statistical displays other than heatmaps may be employed to represent entropic values across the ROI, and different color schemes may be employed to represent areas of low entropy and areas of high entropy.

Example methods and apparatus leverage pixel-level gradient orientation entropy that captures cellular disorder that is not analyzed by conventional methods. Example methods and apparatus facilitate making more accurate distinctions of disease phenotypes. Improving disease phenotype distinction improves the allocation of resources, personnel, and therapeutics to appropriate patients while sparing other patients from treatment that might have been prescribed with a less accurate distinction. For example, brain cancer phenotypes that are difficult to distinguish using conventional MRI methods may be distinguished by example methods and apparatus faster, more accurately, and without the need for surgical biopsy.

In one example, a method may be implemented as computer executable instructions. Thus, in one example, a computer-readable storage medium may store computer executable instructions that if executed by a machine (e.g., computer) cause the machine to perform methods described or claimed herein including method 100, method 200, and method 300. While executable instructions associated with the listed methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

Figure 4:
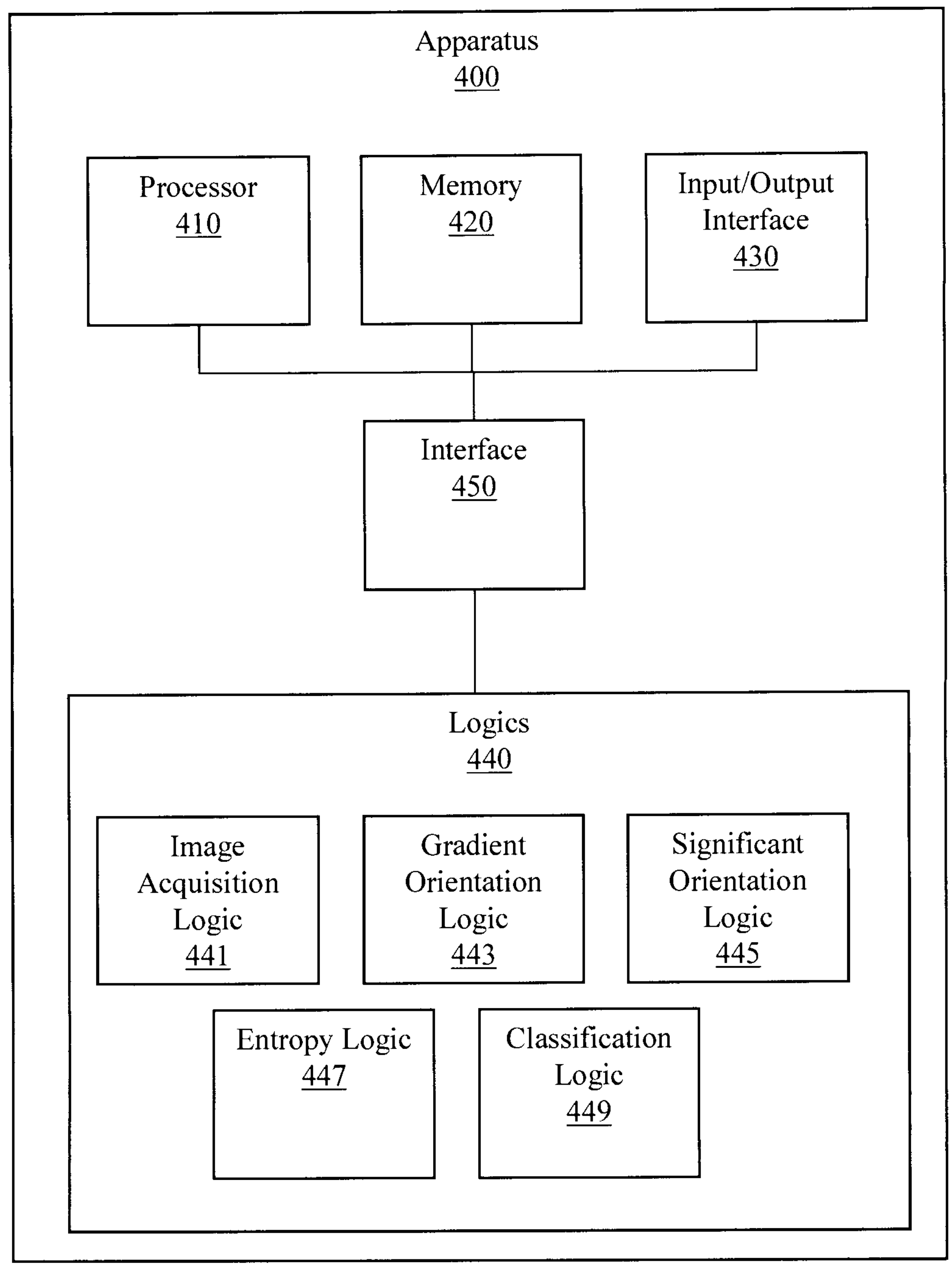
FIG. 4 illustrates an example apparatus that classifies disease phenotype in a patient.

FIG. 4 illustrates an example apparatus 400 that distinguishes disease phenotypes displayed in a ROI obtained from an MRI of a patient. Apparatus 400 includes a processor 410, a memory 420, an input/output interface 430, a set of logics 440, and an interface 450 that connects the processor 410, the memory 420, the input/output interface 430, and the set of logics 440. The set of logics 440 includes an image acquisition logic 441, a gradient orientation logic 443, a significant orientation logic 445, an entropy logic 447, and a classification logic 449.

Image acquisition logic 441 acquires an image of a region of tissue. The region of tissue may be a section of tissue demonstrating cancerous pathology in a patient. In one embodiment, the image is an MRI image. The MRI image has a plurality of pixels. A pixel in the MRI region has an intensity. In one embodiment, the volume illustrated in the MRI image may be associated with a Gd-C T1-weighted MRI image of a patient demonstrating brain cancer pathology. In another embodiment, the volume illustrated in the MRI image may be associated with a dynamic contrast enhanced (DCE)-MRI image of a patient demonstrating breast cancer pathology. In other embodiments, the volume illustrated in the image may be associated with other imaging systems, or be of other regions demonstrating other types of cancer pathology. Thus, accessing the image may include interacting with an MRI system, a computerized tomography (CT) system, or a positron emission tomography (PET) system. Other imaging systems may be used to generate and access the image accessed by image acquisition logic 441.

Gradient orientation logic 443 computes a gradient orientation for a pixel in the MRI image. In one embodiment, gradient orientation logic 443 computes the gradient orientation as a function of a first-axis intensity gradient for the pixel and a second-axis intensity gradient for the pixel. In another embodiment, gradient orientation logic 443 may compute the gradient orientation as a function of more than two axes.

Significant orientation logic 445 computes the most significant orientation for the pixel based on the gradient orientation. In one embodiment, significant orientation logic 445 uses principal component analysis (PCA) to compute the most significant orientation for the pixel. In another embodiment, the most significant orientation for the pixel may be computed using techniques other than PCA. Significant orientation logic 445 constructs a localized gradient orientation matrix. Elements of the localized gradient orientation matrix include a first-axis gradient vector for a second pixel. The second pixel may be located within a threshold distance of the first pixel. Elements of the localized gradient orientation matrix also include a second-axis gradient vector for the second pixel. In another embodiment, the localized gradient orientation matrix may include gradient vectors for more than two axes.

Entropy logic 447 constructs a feature vector. Entropy logic 447 obtains the values of the feature vector by computing a discretizing entropy distribution for the image. The discretized entropy distribution is based on the most significant orientation of the pixel. The discretized entropy distribution may be obtained from a histogram of the entropy where the histogram is divided into bins. The histogram bin size may be optimized based on a training set using grid search optimization.

Classification logic 449 classifies the phenotype of the cancerous pathology exhibited by the image. Classification logic 449 bases the classification, at least in part, on the feature vector. Apparatus 400 thus improves on conventional disease phenotype distinguishing apparatuses which employ LBP, HoG, Haralick, or GLCM separately.

In another embodiment, classification logic 449 may control a computer aided diagnosis (CADx) system to classify the image based, at least in part, on the feature vector. For example, classification logic 449 may control a computer aided BCa diagnostic system to distinguish the image based, at least in part, on the feature vector. In other embodiments, other types of CADx systems may be controlled, including CADx systems for distinguishing phenotypes among prostate cancer, colon cancer, lung cancer, bone metastases, and other diseases where disease phenotype may be distinguished based on entropy captured in the feature vector.

In one embodiment of apparatus 400, the set of logics 440 also includes a display logic. The display logic generates a heatmap of the image. The heatmap represents entropy values obtained from localized pixel orientations. Higher entropy values are displayed as a first color and lower entropy values are displayed as a second color. For example, higher entropy values may be displayed as red and lower entropy values may be displayed as blue. The display logic may control the CADx system to display the classification or the heatmap on a computer monitor, a smartphone display, a tablet display, or other displays. Displaying the classification or the heatmap may also include printing the classification or the heatmap. The display logic may also control the CADx to display an image of the ROI. The image of the ROI may include a heatmap of the entropy distribution across the ROI. The display logic may also display a histogram of the entropy of localized gradient orientations.

Figure 5:
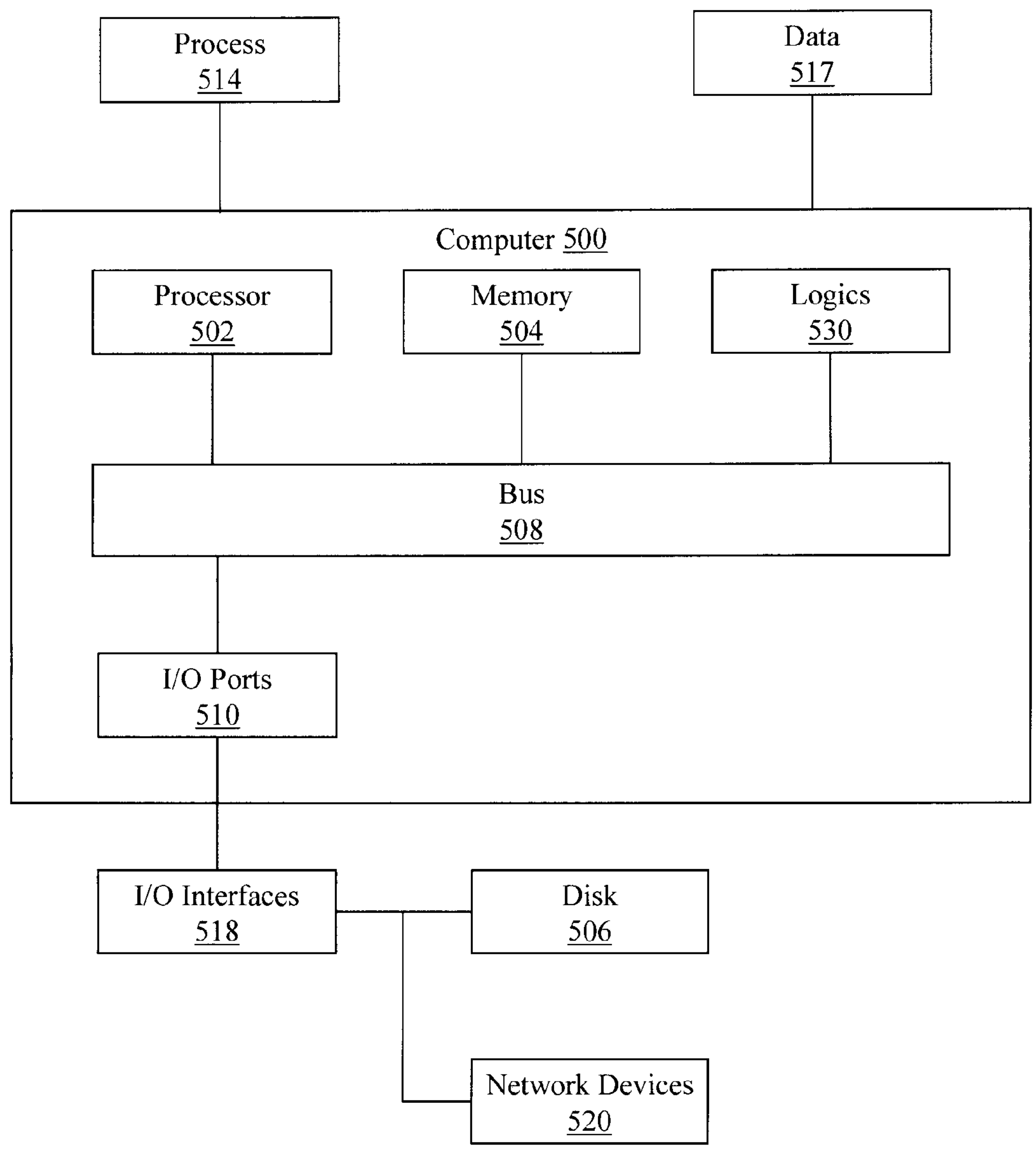
FIG. 5 illustrates an example computer in which example methods and apparatus described herein operate.

FIG. 5 illustrates an example computer 500 in which example methods illustrated herein can operate and in which example logics may be implemented. In different examples, computer 500 may be part of an MRI system, may be operably connectable to an MRI system, or may be part of a CADx system.

Computer 500 includes a processor 502, a memory 504, and input/output ports 510 operably connected by a bus 508. In one example, computer 500 may include a set of logics 530 that perform a method of distinguishing disease phenotypes in a cancer patient using co-occurrence of local anisotropic gradient orientations. Thus, the set of logics 530, whether implemented in computer 500 as hardware, firmware, software, and/or a combination thereof may provide means (e.g., hardware, software) for distinguishing disease phenotypes in a cancer patient using co-occurrence of local anisotropic gradient orientations. In different examples, the set of logics 530 may be permanently and/or removably attached to computer 500.

Processor 502 can be a variety of various processors including dual microprocessor and other multi-processor architectures. Memory 504 can include volatile memory and/or non-volatile memory. A disk 506 may be operably connected to computer 500 via, for example, an input/output interface (e.g., card, device) 518 and an input/output port 510. Disk 506 may include, but is not limited to, devices like a magnetic disk drive, a tape drive, a Zip drive, a flash memory card, or a memory stick. Furthermore, disk 506 may include optical drives like a CD-ROM or a digital video ROM drive (DVD ROM). Memory 504 can store processes 514 or data 517, for example. Disk 506 or memory 504 can store an operating system that controls and allocates resources of computer 500.

Bus 508 can be a single internal bus interconnect architecture or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet).

Computer 500 may interact with input/output devices via I/O interfaces 518 and input/output ports 510. Input/output devices can include, but are not limited to, digital whole slide scanners, an optical microscope, a keyboard, a microphone, a pointing and selection device, cameras, video cards, displays, disk 506, network devices 520, or other devices. Input/output ports 510 can include but are not limited to, serial ports, parallel ports, or USB ports.

Computer 500 may operate in a network environment and thus may be connected to network devices 520 via I/O interfaces 518 or I/O ports 510. Through the network devices 520, computer 500 may interact with a network. Through the network, computer 500 may be logically connected to remote computers. The networks with which computer 500 may interact include, but are not limited to, a local area network (LAN), a wide area network (WAN), or other networks.

Figure 6:
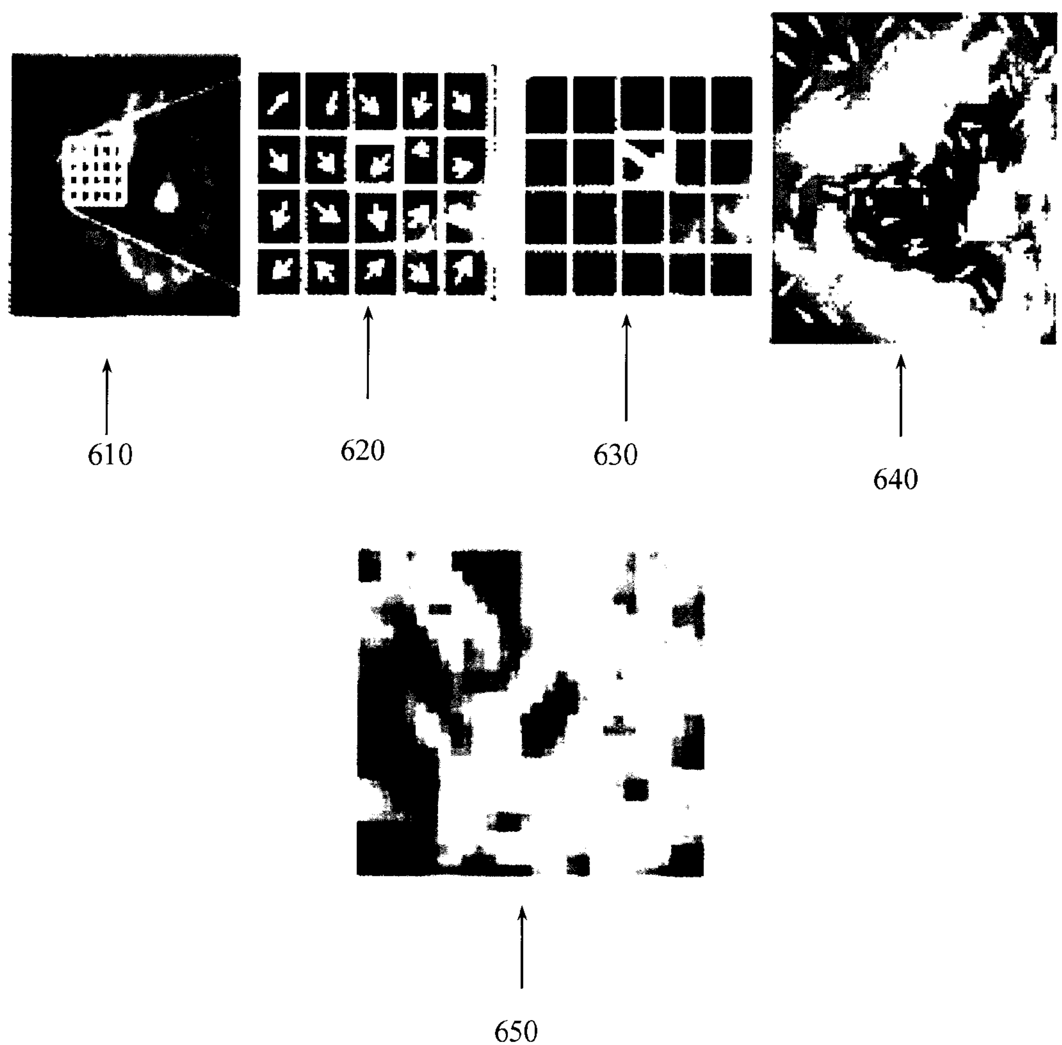
FIG. 6 illustrates steps involving extraction of CoLIAGe features from an MRI image.

FIG. 6 is a graphical representation of steps involving the extraction of CoLIAGe features from an ROI in a volume illustrated in an MRI image in an embodiment of example methods and apparatus. The ROI has a set of pixels, and a pixel in the set of pixels has an intensity. Element 610 illustrates a 5 pixel by 4 pixel neighborhood superimposed on a gray-scale image of an ROI of a region of cancerous tissue. Element 620 illustrates a close-up view of the 5 pixel by 4 pixel neighborhood with pixel-wise gradient orientations represented by directional arrows in each of the cells of the 5 pixel by 4 pixel neighborhood. In one embodiment, the pixel-wise gradient orientations represented in element 620 are calculated at steps 120, 124, and 128 of method 100. Element 630 illustrates the same 5 pixel by 4 pixel neighborhood, but with the dominant gradient orientation for the pixel upon which the neighborhood is centered illustrated. In one embodiment, the dominant gradient orientation illustrated in element 630 corresponds with the dominant gradient orientation calculated at step 140 of method 100. In another embodiment, element 630 corresponds with element 236 of FIG. 2. Element 640 illustrates the dominant orientations of the pixels in the ROI superimposed over the gray-scale image of the ROI represented in element 610. FIG. 6 also includes an entropic heatmap 650. In one embodiment, entropic heatmap 650 displays the entropy by the dominant gradient orientations quantified as color ranges. In one embodiment, areas of higher entropy are represented by a first color, and areas of lower entropy are represented by a second, different color.

Figure 7:
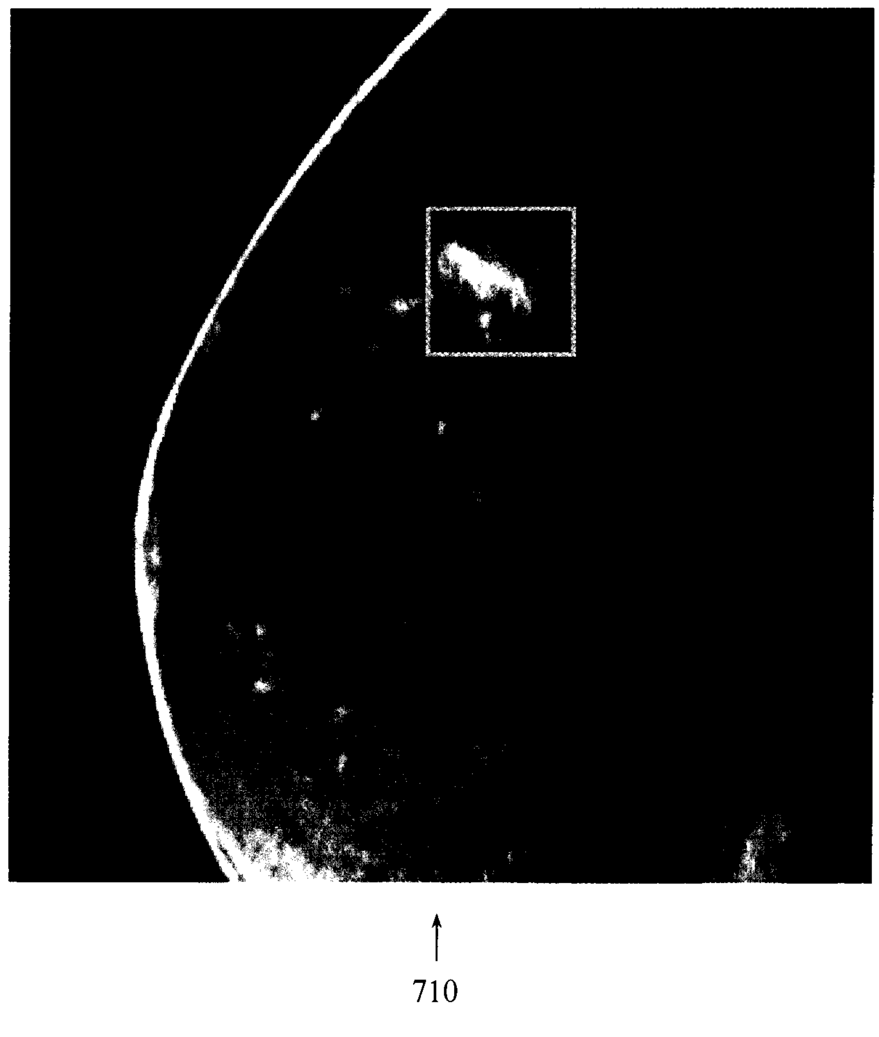
FIG. 7 illustrates a dynamic contrast enhanced (DCE) magnetic resonance imaging (MRI) image of a region of breast tissue demonstrating HER2+ pathology.

FIG. 7 is representative of a point in time of a dynamic contrast enhanced (DCE) magnetic resonance imaging (MRI) image 710 of a region of breast tissue demonstrating HER2+ pathology.

Figure 8:
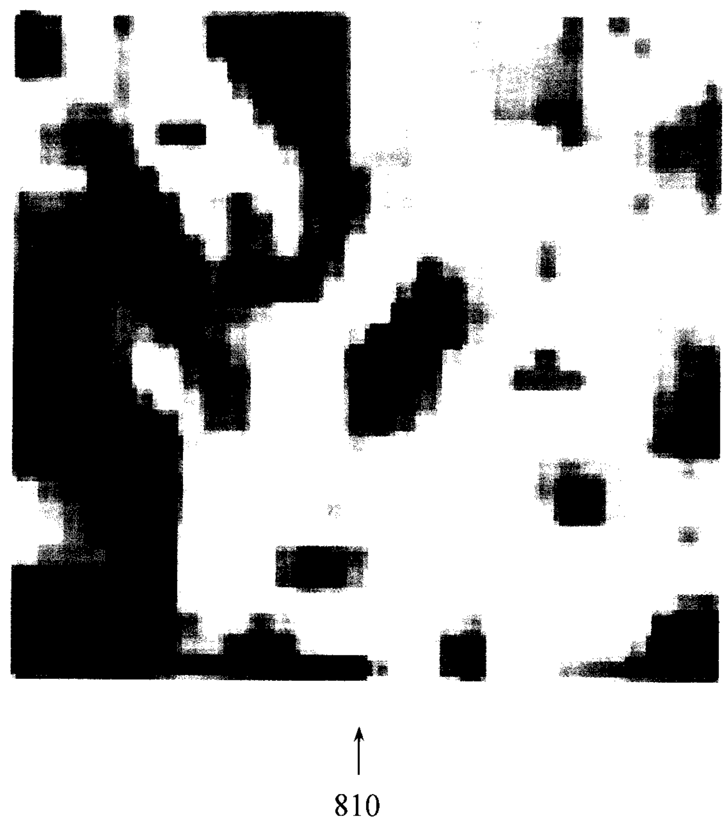
FIG. 8 illustrates a point in time of a dynamic entropic heatmap of a region of diseased tissue.

FIG. 8 illustrates a point in time of a dynamic entropic heatmap 810 generated from a DCE-MRI image of a region of breast tissue demonstrating HER2+ pathology.

Figure 10:
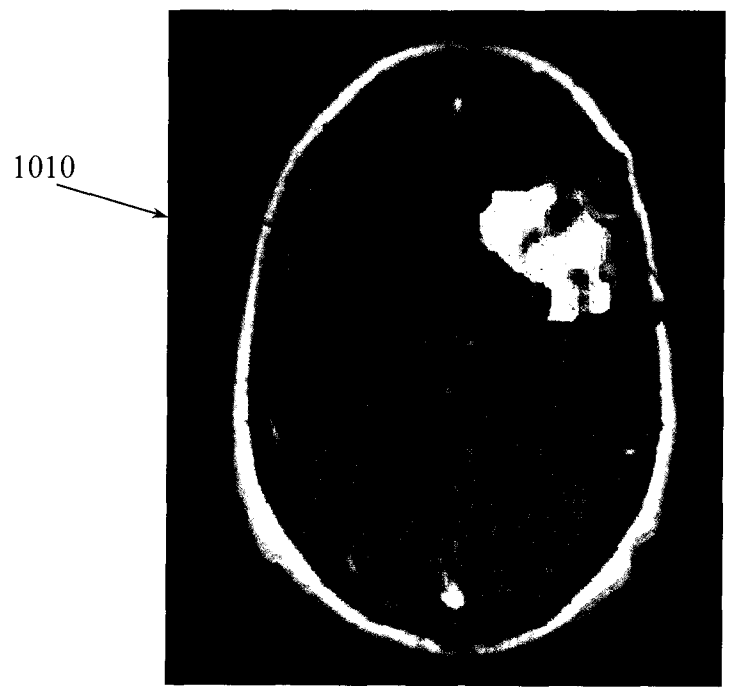
FIG. 10 illustrates providing site-specific information based on variable representation on heatmaps.
Figure 10:
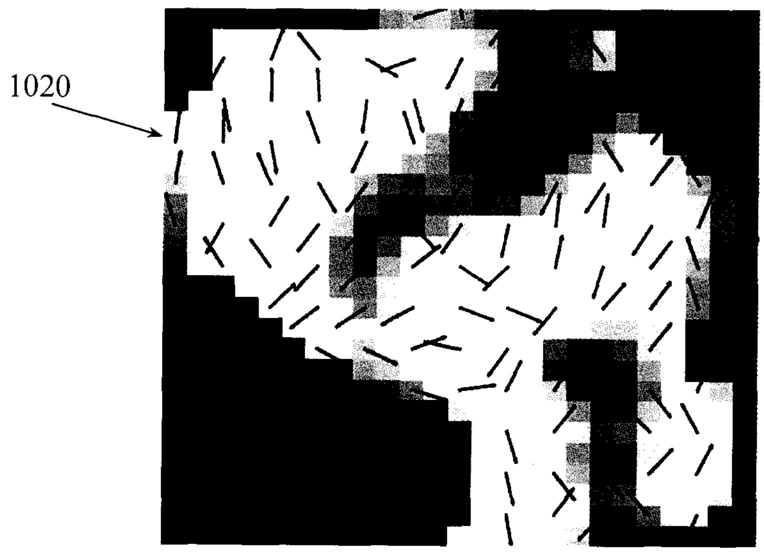

FIG. 10 illustrates providing site-specific information based on variable representation on heatmaps. In addition to being a potential biomarker for distinguishing disease subtypes, example apparatus and methods may provide site-specific information for better targeted therapy/treatment in complex disease environments. Radiologic image 1010 includes a super-imposed heatmap 1020.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage medium storing computer-executable instructions that when executed by a computer control the computer to perform a method for distinguishing disease phenotypes using co-occurrence of local anisotropic gradient orientations (CoLIAGe), the method comprising:

accessing a region of interest (ROI) in a volume illustrated in a magnetic resonance image (MRI), the ROI having a set of pixels, and where a pixel in the set of pixels has an intensity;

obtaining an x-axis gradient for a first pixel in the set of pixels based, at least in part, on the intensity of the pixel;

obtaining a y-axis gradient for the first pixel based, at least in part, on the intensity of the pixel;

computing an x-axis gradient vector for a second pixel in an N pixel by N pixel neighborhood centered around the first pixel, N being a number;

computing a y-axis gradient vector for the second pixel in the N pixel by N pixel neighborhood;

constructing a localized gradient vector matrix based, at least in part, on the x-axis gradient vector for the second pixel, and the y-axis gradient vector for the second pixel;

computing a dominant orientation for the first pixel based, at least in part, on the localized gradient vector matrix;

constructing a co-occurrence matrix from the dominant orientation;

computing an entropy for the first pixel based, at least in part, on the co-occurrence matrix;

obtaining a distribution of the entropy;

constructing a feature vector based, at least in part, on the distribution of the entropy; and controlling a phenotype classifier to classify the ROI based, at least in part, on the feature vector.

2. The non-transitory computer-readable storage medium of claim 1, where the volume illustrated in the MRI is associated with a Gadolinium-contrast (Gd-C) T1-weighted MRI image of a patient demonstrating brain cancer pathology.

3. The non-transitory computer-readable storage medium of claim 2, where controlling the phenotype classifier to classify the ROI includes distinguishing radiation necrosis (RN) from recurrent brain tumors (rBT) in the ROI.

4. The non-transitory computer-readable storage medium of claim 1, where the volume illustrated in the MRI is associated with a dynamic contrast enhanced (DCE)-MRI image of a patient demonstrating breast cancer pathology.

5. The non-transitory computer-readable storage medium of claim 4, where controlling the phenotype classifier to classify the ROI includes identifying phenotypic imaging signatures of a plurality of molecular sub-types of breast cancer, where the plurality of sub-types includes triple negative (TN), estrogen receptor-positive (ER+), human epidermal growth factor receptor positive (HER2+), and benign fibroadenoma (FA).

6. The non-transitory computer-readable storage medium of claim 1, where the ROI is defined as $\mathcal{C}=(C,f)$, where f(c) is an associated intensity at the first pixel c on a three dimensional (3D) grid C.

7. The non-transitory computer-readable storage medium of claim 6, where obtaining the x-axis gradient for the first pixel and obtaining the y-axis gradient for the first pixel includes computing $$\nabla f(c) = \frac{\partial f(c)}{\partial X}\hat{i} + \frac{\partial f(c)}{\partial Y}\hat{j},$$

where $$\frac{\partial f(c)}{\partial X}$$

represents the gradient magnitude along the X axis, and where $$\frac{\partial f(c)}{\partial Y}$$

represents the gradient magnitude along the Y axis.

8. The non-transitory computer-readable storage medium of claim 1, where constructing the localized gradient vector matrix comprises computing the localized gradient vector matrix in a two dimensional neighborhood of dimension $N^2\times 2$.

9. The non-transitory computer-readable storage medium of claim 8, where computing the x-axis gradient vector for the second pixel in the N pixel by N pixel neighborhood centered around the first pixel includes computing $\overrightarrow{\partial f_X}(c_k)$, and where computing the y-axis gradient vector for the second pixel includes computing $\overrightarrow{\partial f_Y}(c_k)$, where $k\epsilon\{1, 2, \ldots, N^2\}$.

10. The non-transitory computer-readable storage medium of claim 9, where the localized gradient vector matrix is defined as $\vec{F}=[\overrightarrow{\partial f_X}(c_k)\overrightarrow{\partial f_Y}(c_k)]$.

11. The non-transitory computer-readable storage medium of claim 10, where computing the dominant orientation for the first pixel includes calculating $$\phi(c) = \tan^{-1}\frac{r_Y^k}{r_X^k},$$

where $r_X^k$ represents the dominant principal component in X, where $r_Y^k$ represents the dominant principal component in Y, where $k\epsilon\{1, 2, \ldots, N^2\}$, and where $r_X^k$ and $r_Y^k$ are obtained using principal component analysis (PCA).

12. The non-transitory computer-readable storage medium of claim 11, where the co-occurrence matrix is an N×N matrix $\mathcal{M}$, where $\mathcal{M}$ captures orientation pairs between pixels that co-occur in a neighborhood $\mathcal{W}_i$.

13. The non-transitory computer-readable storage medium of claim 12, where $$\mathcal{M}_{W_i}(p,q) = \sum_{c_j,c_k}^{W_i} \sum_{p,q=1}^{N} \begin{cases} 1, \text{ if } \phi(c_j) = p \text{ and } \phi(c_k) = q \\ 0, \text{ otherwise} \end{cases},$$

where $\bar{\phi}(c_k)$ is a discretized dominant orientation for a pixel $c_k$, where $$\bar{\phi}(c_k) = \omega \times \text{ceil}\left(\frac{\phi(c_k)}{\omega}\right),$$

where ω is a discretizing factor, and where $$N = \frac{180}{\omega}$$

represents a number of discrete angular bins.

14. The non-transitory computer-readable storage medium of claim 13, where computing the entropy ϵ for the pixel includes computing $$\epsilon(c) = \Sigma_{p,q} - \mathcal{M}(p,q)\log(\mathcal{M}(p,q)).$$

15. The non-transitory computer-readable storage medium of claim 14, where obtaining the distribution for the entropy includes computing a histogram of ϵ by aggregating $\epsilon(c_k)$, $k \in \{1, \ldots, |C|\}$, where |C| is the cardinality of C, and where the histogram is divided into a plurality of bins, where a bin has a size v.

16. The non-transitory computer-readable storage medium of claim 15, where the feature vector is a v×1 vector $\mathcal{F}$, and where values of $\mathcal{F}$ are obtained from the histogram.

17. The non-transitory computer-readable storage medium of claim 16, where v=30 and N=7.

18. A non-transitory computer-readable storage medium storing computer-executable instructions that when executed by a computer control the computer to perform a method for dynamically distinguishing disease phenotypes, the method comprising:

accessing, substantially in real-time, a region of interest (ROI) of a radiologic image volume of a region of diseased tissue, where the ROI has a set of pixels, where a pixel in the set of pixels has an intensity;

calculating an intensity gradient orientation for a first pixel in the set of pixels;

constructing a localized gradient vector matrix, where an element of the localized gradient vector matrix includes an intensity gradient vector for a second pixel located within a local neighborhood of the first pixel, where the dimensions of the local neighborhood are defined by a threshold distance;

computing a discretized dominant orientation for the first pixel based, at least in part, on the localized gradient vector matrix;

constructing a co-occurrence matrix, where the elements of the co-occurrence matrix include co-occurring dominant orientations for a subset of the set of pixels;

computing an entropy for the pixel based, at least in part, on the co-occurrence matrix;

obtaining a distribution of the entropy;

constructing a feature vector based, at least in part, on the distribution of the entropy;

generating an entropic heatmap based, at least in part, on the feature vector;

administering a contrast agent to the ROI;

obtaining an updated ROI, substantially in real time; and updating, substantially in real time, the entropic heatmap, based, at least in part, on the updated radiologic image.

19. The non-transitory computer-readable storage medium of claim 18, the method comprising dynamically controlling, substantially in real-time, a surgical intervention into the ROI based, at least in part, on the updated entropic heatmap.

20. The non-transitory computer-readable storage medium of claim 19, where the surgical intervention is gamma knife brain surgery.

21. The non-transitory computer-readable storage medium of claim 20, the method comprising identifying changes in pre-treatment and post exposure therapy in an ROI demonstrating breast cancer pathology based, at least in part, on the updated entropic heatmap.

22. A non-transitory computer-readable storage medium storing computer-executable instructions that when executed by a computer control the computer to perform a method for distinguishing disease phenotypes, the method comprising:

accessing a region of interest (ROI) in a volume illustrated in a radiologic image, where the ROI has a set of pixels, and where a pixel in the set of pixels has an intensity;

computing a local dominant gradient orientation for a first pixel in the set of pixels;

constructing a co-occurrence matrix for the set of pixels, based, at least in part, on the local dominant orientation;

computing an entropy measure for the set of pixels based, at least in part, on the co-occurrence matrix;

constructing a feature vector based on a distribution of the entropy measure; and controlling a disease phenotype classification system to classify the ROI based, at least in part, on the feature vector.

23. The non-transitory computer readable storage medium of claim 22, where computing the local dominant gradient orientation for the first pixel includes:

obtaining a set of gradients for the first pixel along a plurality of axes;

computing a gradient orientation for the pixel based, at least in part, on the set of gradients;

computing a set of gradient vectors for a plurality of pixels in a neighborhood, where the neighborhood is centered on the first pixel;

constructing a localized gradient vector matrix from the set of gradient vectors; and computing the local dominant gradient orientation for the first pixel using principal component analysis (PCA) based, at least in part, on the localized gradient vector matrix.

24. The non-transitory computer readable storage medium of claim 23, where constructing the co-occurrence matrix includes:

discretizing the local dominant gradient orientation for the first pixel; and populating the co-occurrence matrix with local dominant gradient orientation pairs that co-exist between pixels in the neighborhood.

25. The non-transitory computer readable storage medium of claim 24, where computing the entropy measure includes:

aggregating the entropy measure for a subset of the set of pixels, where the entropy measure is based, at least in part, on the co-occurrence matrix; and constructing a histogram of the entropy measure for set of pixels, where the histogram is divided into bins, where a bin has a threshold size.

26. The non-transitory computer readable storage medium of claim 25, where constructing the feature vector includes extracting entropy measure values from a distribution of the histogram.

27. The non-transitory computer readable storage medium of claim 26, where controlling the disease phenotype classification system includes constructing a heatmap based on the feature vector, where hot areas of the heatmap represent high entropy values, and where cool areas of the heatmap represent low entropy values.

28. An apparatus for distinguishing disease phenotypes, comprising:

a processor;

a memory;

an input/output interface;

a set of logics; and an interface to connect the processor, the memory, the input/output interface and the set of logics, where the set of logics includes:

an image acquisition logic that acquires a radiologic image of a region of tissue demonstrating cancerous pathology, where the radiologic image has a plurality of pixels, where a pixel has an intensity;

a gradient orientation logic that computes a gradient orientation for a pixel in the radiologic image based, at least in part, on an first-axis intensity gradient for the pixel and a second-axis intensity gradient for the pixel;

a significant orientation logic that computes the most significant orientation for the pixel based on the gradient orientation;

an entropy logic that constructs a feature vector, where the values of the feature vector are obtained by computing a discretized entropy distribution for the image based on the most significant orientation of the pixel; and a classification logic that classifies the phenotype of the cancerous pathology exhibited by the image based, at least in part, on the feature vector.

29. The apparatus of claim 28, where the significant orientation logic uses principal component analysis (PCA) to compute the most significant orientation for the pixel by constructing a localized gradient vector matrix, where elements of the localized gradient vector matrix include a first-axis gradient vector for a second pixel located within a threshold distance of the first pixel, and a second-axis gradient vector for the second pixel.

30. The apparatus of claim 29, comprising a display logic that generates a heatmap of the image, where the heatmap represents entropy values obtained from localized pixel orientations, where the heatmap displays higher entropy values as a first color and lower entropy values as a second, different color.

* * * * *